(12) United States Patent
Cummings

(10) Patent No.: US 7,390,410 B2
(45) Date of Patent: Jun. 24, 2008

(54) METHOD AND APPARATUS FOR THE ANAEROBIC TREATMENT OF WASTE

(75) Inventor: Robert James Cummings, Spencer, NY (US)

(73) Assignee: Ecovation, Inc., Victor, NY (US)

( * ) Notice: Subject to any disclaimer, the term of this patent is extended or adjusted under 35 U.S.C. 154(b) by 0 days.

(21) Appl. No.: 11/304,214

(22) Filed: Dec. 15, 2005

(65) Prior Publication Data

US 2006/0157407 A1   Jul. 20, 2006

Related U.S. Application Data

(60) Provisional application No. 60/636,253, filed on Dec. 15, 2004.

(51) Int. Cl.
*C02F 3/28* (2006.01)

(52) U.S. Cl. .................. 210/603; 210/617; 210/151; 210/195.3; 210/195.4

(58) Field of Classification Search ................ 210/603, 210/615, 617, 150, 151, 256, 195.3, 195.4
See application file for complete search history.

(56) References Cited

U.S. PATENT DOCUMENTS

| | | | |
|---|---|---|---|
| 3,539,507 A | | 11/1970 | Woodbridge et al. |
| 4,188,289 A | * | 2/1980 | Besik .......................... 210/617 |
| 4,746,433 A | * | 5/1988 | Nobl et al. ................... 210/617 |
| 5,062,958 A | | 11/1991 | Bateson et al. |
| 5,080,793 A | | 1/1992 | Urlings |
| 5,264,128 A | | 11/1993 | Thuer et al. |
| 5,411,665 A | | 5/1995 | Scraggs et al. |
| 5,500,112 A | * | 3/1996 | McDonald ................... 210/151 |
| 5,645,725 A | | 7/1997 | Zitzelsberger et al. |
| 5,688,400 A | * | 11/1997 | Baxter, Sr. .................. 210/256 |
| 5,725,770 A | | 3/1998 | Henry |
| 5,733,454 A | | 3/1998 | Cummings |
| 5,795,480 A | * | 8/1998 | Keun et al. .................. 210/151 |
| 5,843,305 A | * | 12/1998 | Kim et al. .................... 210/151 |
| 5,989,428 A | | 11/1999 | Goronszy |
| 6,007,712 A | | 12/1999 | Tanaka et al. |
| 6,190,548 B1 | * | 2/2001 | Frick .......................... 210/617 |
| 6,207,047 B1 | | 3/2001 | Gothreaux |
| 2003/0034300 A1 | | 2/2003 | Srinivasan et al. |

FOREIGN PATENT DOCUMENTS

| | | |
|---|---|---|
| DE | 3316720 A1 | 11/1984 |
| EP | 0 545 557 A2 | 6/1993 |

OTHER PUBLICATIONS

A. Brobicki and D.C. Stuckey, Performance of the anaerobic baffled reactor, Fifth International Symposium on Anaerobic Digestion, Bologna, Italy, May 22-26, 1988, pp. 267-271.
PCT International Search Report, PCT/US2005/045504, filing date of Dec. 15, 2005, Applicant Ecovation, Inc.

* cited by examiner

*Primary Examiner*—Christopher Upton
(74) *Attorney, Agent, or Firm*—Greenberg Traurig LLP; Ben D. Tobor

(57) ABSTRACT

A method and apparatus for the anaerobic treatment of waste water is described which includes a plug flow bioreactor containing a single bed of inert microbial attachment media and anaerobic microorganisms, and having at least one baffle member which forms a first zone and at least one second zone above the bed of inert microbial attachment media within the plug flow bioreactor.

10 Claims, 3 Drawing Sheets

METHOD AND APPARATUS FOR THE ANAEROBIC TREATMENT OF WASTE

RELATED APPLICATION

This application claims the benefit and priority of U.S. patent application Ser. No. 60/636,253 filed Dec. 15, 2004, entitled Method and Apparatus for the Anaerobic Treatment of Waste.

BACKGROUND OF THE INVENTION

1. Field of the Invention

The invention relates generally to a method and apparatus for the anaerobic treatment of waste water, or flowable waste, wherein a plug flow bioreactor is utilized to treat the waste water.

2. Description of the Related Art

Many types of anaerobic microbial treatment processes have been utilized for the anaerobic treatment of soluble and particulate colloidal organic material in agricultural, domestic, and industrial waste water, or flowable waste, wherein the organic material is converted to methane, carbon dioxide, water and cell biomass, or sludge. One type of anaerobic treatment systems is the anaerobic attached film expanded bed waste water treatment system. The anaerobic attached film expanded bed technology utilizes a hydraulically expanded bed, typically a heterogeneous mixture of microorganisms, for example bacteria, which become attached to and entrapped within a bed of small diameter, biologically inert, support particles. These anaerobic attached film expanded beds are used in connection with a treatment vessel, or bioreactor.

Bioreactors, in general, may be operated in either a plug flow mode, or as a completely mixed flow bioreactor. In a bioreactor operating in a plug flow mode, the first liquid, or waste water, to enter the bioreactor is the first liquid, or treated waste water, out of the reactor. There is no longitudinal mixing of the waste water, and each unit of liquid, or waste water treated in the bioreactor remains in the bioreactor for an exact predetermined period of time, or in other words, the "hydraulic retention" time of each unit of liquid to be treated is the same. In completely mixed bioreactors, or completely mixed flow bioreactors, only the average hydraulic retention time is the same as the plug flow retention time, since some units of the liquid to be treated, or waste water, leave the bioreactor very quickly, while other units of liquid remain for a longer period of time, or for a longer hydraulic retention time.

Although it is known in the waste water treatment field that a bioreactor operating in a plug flow mode is more efficient in the removal of pollutants than a single, completely mixed bioreactor of comparable volume, the vast majority of anaerobic bioreactors have not completely achieved the desired plug flow mode, wherein the first liquid charged into the bioreactor is the first to leave the bioreactor, and "short circuiting", or liquid particles having a shorter residence time in the bioreactor, is prevented. Undesired, excess short circuiting may occur particularly in the space above the bed of support particles through which the waste water to be treated passes upwardly therethrough. It would be desirable if an anaerobic bioreactor could be provided which better provides plug flow of the waste water throughout the bioreactor.

The fermentation of organic material to methane, carbon dioxide, and water vapor involves a consortium of anaerobic and facultative microorganisms that must be maintained in a substantially precise balance to achieve high rate, highly efficient conversion of the waste material. This consortium includes a first group of organisms, or hydrolyzers, to convert complex organic material to polysaccharides and monosaccharides. Another group of organisms are acidifiers to convert the monosaccharides to volatile acids. Lastly, the consortium includes a third group of organisms, or methanogenes, which convert the volatile acids to methane in carbon dioxide. As a given organic load is applied to a bioreactor containing all the microorganisms of the consortium, the population of each group of the consortium adjusts to produce a specific balance with the other groups. In other words, with respect to a given organic load, there would be a certain, or particular, number of hydrolyzers, a certain number of the acidifiers, and a particular number methanogenes. As the organic loading is increased, the number of microorganisms of each group typically changes, or increases, to maintain the optimal balance. The optimization of the microorganism populations requires that all the microorganisms co-exist and adjust as a group to changes in the organic loading. In general, when prior art bioreactors are operated in series, each individual bioreactor contains a separate series of individual compartments, each containing the unique consortium of the microorganisms. These bioreactors generally do not have the capability to adjust to changing organic loading in an optimal fashion. The microorganisms required for hydrolyzing are physically segregated from those responsible for acidification, and in turn those microorganisms responsible for acidification are physically segregated from those responsible for methane generation. It is believed that an optimum balance cannot be established with changing organic loading upon the bioreactor. It would be desirable if an anaerobic bioreactor could be provided with the balance of the microorganism population being readily maintained as the organic loading rate changes.

SUMMARY OF THE INVENTION

In accordance with one aspect of the present invention, an apparatus for the anaerobic treatment of waste water is disclosed. This aspect of the present invention may include: a plug flow bioreactor having a plurality of side walls, a top cover, and a bottom wall; a single bed of inert microbial attachment media and having anaerobic microorganisms attached to a substantial portion of the inert microbial attachment media, the bed of inert microbial attachment media substantially covering the bottom wall and having a top bed surface; at least one baffle member having upper and lower surfaces and side edge surfaces, the side edge surfaces being disposed in a substantially sealed relationship with the side walls, the upper surface being disposed in a substantially sealed relationship with the top cover and the lower surface being disposed in contact with the top bed surface of the bed of inert microbial attachment media, the baffle member having at least one opening disposed above the top bed surface, whereby the at least one baffle member forms a first zone and at least one second zone above the bed of inert microbial attachment media within the bioreactor; at least one clarifier disposed in the first zone; at least one clarifier disposed in the at least one second zone; a plurality of nozzles disposed in the bed of inert microbial attachment media; and the at least one opening in the at least one baffle member is in fluid communication with the clarifier in the at least one second zone, whereby waste water, after passing upwardly through a portion of the bed of inert microbial attachment media into the first zone, may pass from the first zone through the at least one opening in the at least one baffle member into the clarifier in the at least one second zone.

Another feature of this aspect of the present invention is that the at least one second zone may have a discharge clarifier through which waste water, after first flowing into the at least one clarifier in the at least one second zone, flows through the bed of inert microbial attachment media into the at least one second zone and into the discharge clarifier. The at least one opening in the at least baffle member may be in direct fluid communication with the clarifier in the at least one second zone.

Another feature of this aspect of the present invention is that the lower surface of the at least one baffle member may be disposed within the bed of inert microbial attachment media and below the top bed surface of the bed of inert microbial attachment media in a space relationship from the bottom wall.

In accordance with another aspect of the present invention, a method for the anaerobic treatment of waste water in a plug flow bioreactor having a plurality of side walls, a top cover, a bottom wall and a bed of inert microbial attachment media having anaerobic microorganisms attached to a substantial portion of the inert microbial attachment media, the bed of inert microbial attachment media substantially covering the bottom wall and having a top bed surface is also disclosed. This aspect of the present invention includes: providing the bioreactor with at least one baffle member having upper and lower surfaces and side edge surfaces; disposing the side edge surfaces in a substantially sealed relationship with the side walls; disposing the upper surface in a substantially sealed relationship with the top cover; disposing the lower surface in contact with the top bed surface of the bed of inert microbial attachment media; providing the at least one baffle member with at least one opening disposed above the top bed surface; forming with the at least one baffle member, a first zone and at least one second zone above the bed of inert microbial attachment media within the bioreactor; providing at least one clarifier in the first zone; providing at least one clarifier in the at least one second zone; providing a plurality of nozzles disposed in the bed of inert microbial attachment media; disposing the at least one opening in the at least one baffle member in fluid communication with the clarifier in the at least one second zone; flowing waste water upwardly through a portion of the bed of inert microbial attachment media into the first zone; and flowing waste water from the first zone through the at least one opening in the at least one baffle member into the clarifier in the at least one second zone.

In accordance with this aspect of the present invention, another feature includes providing a discharge clarifier in the at least one second zone, and flowing waste water from the at least one clarifier in the at least one second zone through the bed of inert microbial attachment media and into the at least one second zone and into the discharge clarifier. A further feature of this aspect of the present invention may include disposing the at least one opening in the at least one baffle member in direct fluid communication with the clarifier in the at least one second zone. An additional feature of this aspect of the present invention may include disposing the lower surface of the at least one baffle member within the bed of inert microbial attachment media and below the top bed surface of the bed of inert microbial attachment media in a space relationship from the bottom wall.

The method and apparatus for the anaerobic treatment of waste water of the present invention are believed to better provide plug flow of the waste water throughout the bioreactor, and better provides a mechanism for the consortium of anaerobic microorganisms to adjust population levels and optimized treatment capability as organic loading changes.

While the invention will be described in connection with the preferred embodiments, it will be understood that it is not intended to limit the invention to those embodiments. On the contrary, it is intended to cover all alternatives, modifications, and equivalents, as may be included within the spirit and scope of the invention as defined by the appended claims.

DETAILED DESCRIPTION OF THE INVENTION AND SPECIFIC EMBODIMENTS

Figure 1:
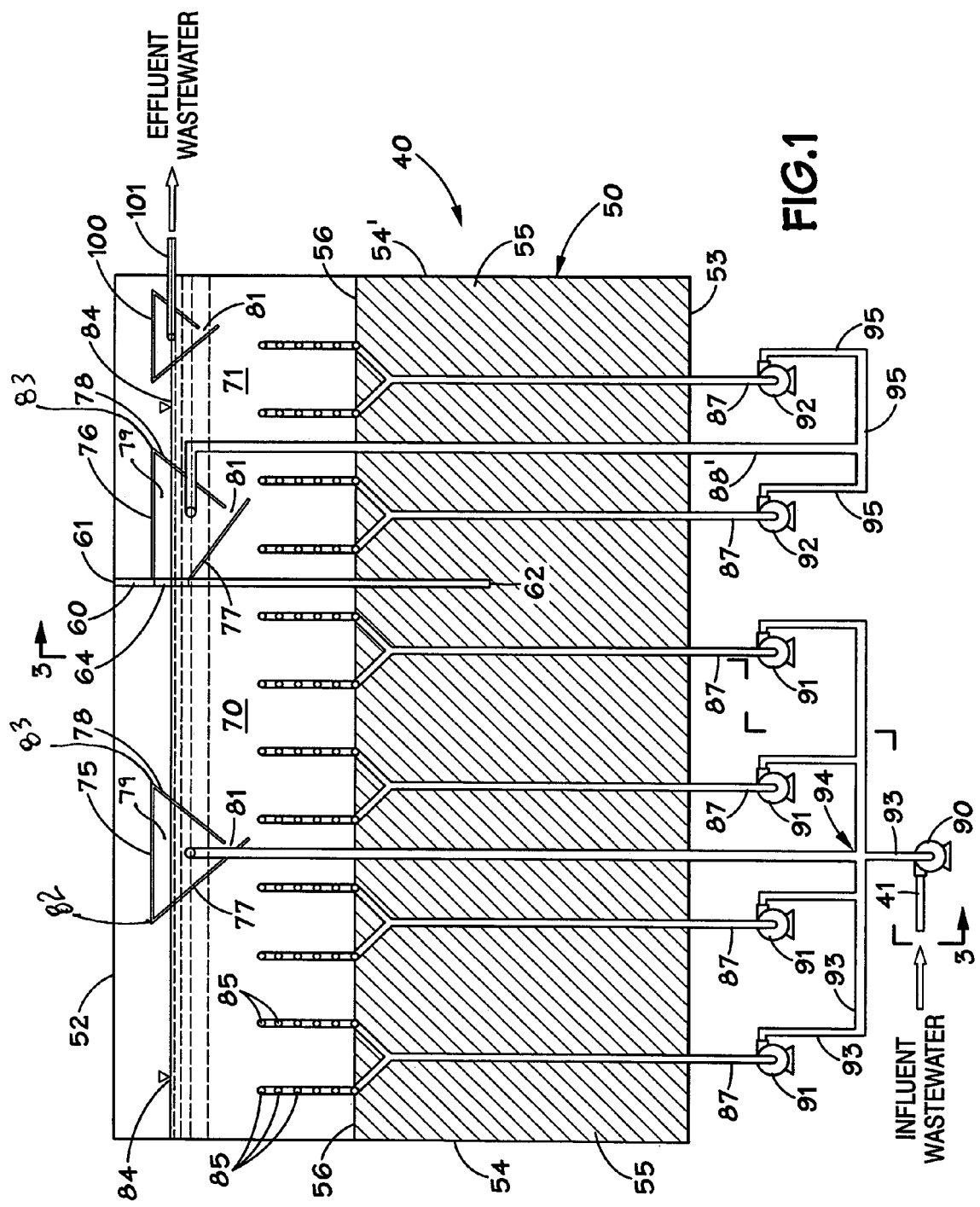
FIG. 1 is a partial cross-section front elevation view of an apparatus for the anaerobic treatment of waste water in accordance with the present invention.
Figure 2:
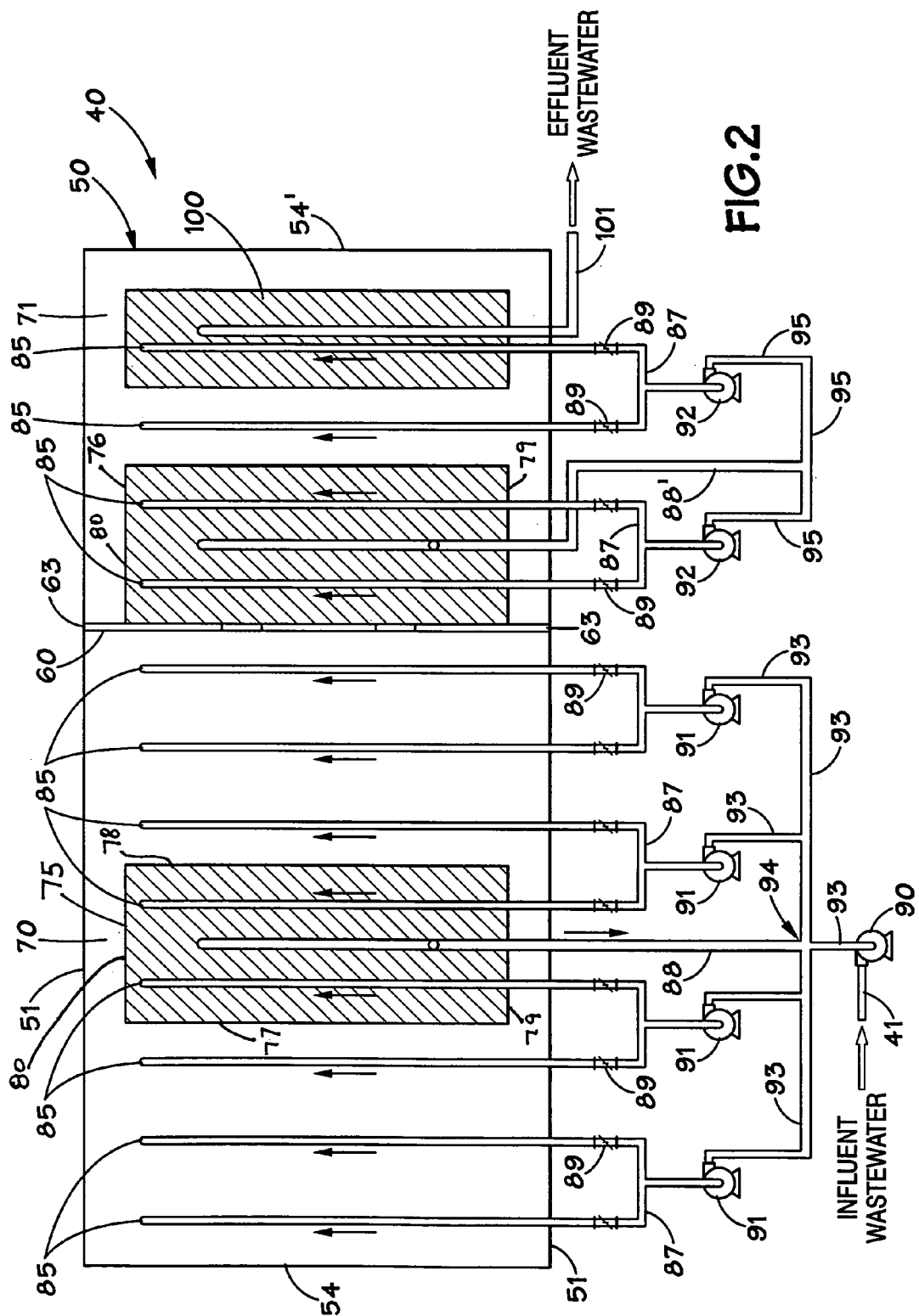
FIG. 2 is a top view of the apparatus of FIG. 1, with its top cover removed.
Figure 3:
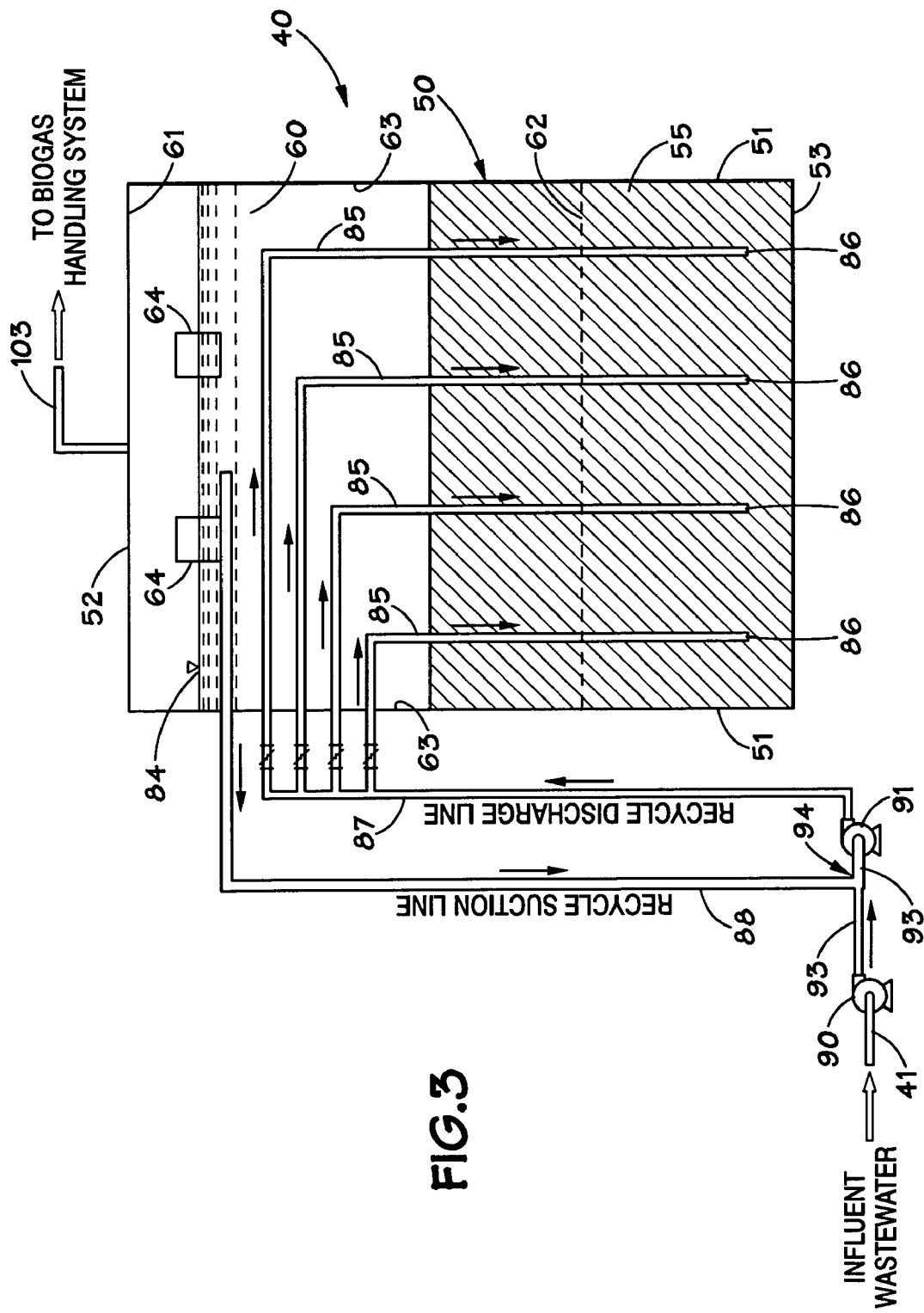
FIG. 3 is a partial cross-sectional view of the apparatus of FIG. 1 taken along line 3-3 of FIG. 1.

With reference to FIGS. 1-3, the apparatus 40 of the present invention for the anaerobic treatment of waste water 41 is illustrated. Apparatus 40 generally includes: a plug flow bioreactor 50; a single bed of inert microbial attachment media 55, or inert support particles, having anaerobic microorganisms (not shown) attached to a substantial portion of the inert microbial attachment media; and at least one baffle member 60 disposed within bioreactor 50. Bioreactor 50 preferably has a plurality of side walls 51, a top cover 52, and a bottom wall 53, and end walls 54, 54'. Bioreactor 50 is illustrated, as seen in FIG. 2, having a generally rectangular cross-sectional configuration when viewed from the top, as well as when viewed from the front as seen in FIG. 1. Other cross-sectional shapes could be utilized, such as a circular cross-sectional shape when viewed from the top, whereby there would only be one continuous side wall 51 on the circumference of the bioreactor 50, or it could have a hexagonal, or other, cross-sectional shapes when viewed from the top as seen in FIG. 2, wherein there would be 5 or more side walls 51. As shown in FIGS. 1 and 3, the bed of inert microbial attachment media, or support particles, 55 substantially covers the bottom wall 53 of bioreactor 50, and preferably covers all of the bottom wall 53 and contacts the interior surfaces of side walls 51 and end walls 54. The bed of inert microbial attachment media 55 has a top bed surface 56, which typically generally parallel with the bottom wall 53 of bioreactor 50. The anaerobic microorganisms, or consortium of microorganisms, may be any anaerobic microorganisms, as are known in the art. The inert microbial attachment media may be any suitable inert media as are known which may function in the manner described herein, and preferably may be sand, garnet, volcanic cinders, flyash, coal, glass, plastic, activated carbon, alumina or diatomaceous earth and mixtures thereof.

With reference to FIGS. 1 and 2, the at least one baffle member 60 has upper and lower surfaces, 61, 62 and side edge surfaces 63. The side edge surfaces 63 are preferably disposed in a substantially sealed relationship with the side walls 51 of the bioreactor 50, and upper surface 61 of the at least baffle member 60 is preferably disposed in a substantially sealed relationship with the top cover 52 of bioreactor 50. The lower surface 62 of the at least one baffle member may be disposed in contact with the top bed surface 56 of the bed of inert microbial attachment media 55. Preferably, the lower surface 62 of the at least one baffle member 60, as shown in FIGS. 1 and 3, is disposed within the bed of inert microbial attachment media 55 and below the top bed surface 56 of the bed of inert microbial attachment media 55 in a spaced relationship from the bottom wall 53. Preferably, the lower surface of baffle 60 extends several feet into the bed of inert microbial attachment media 55. Baffle member 60 has at least one opening, or port, 64, and the at least one opening, or port 64 is disposed above the top bed surface 56. As illustrated in FIGS. 2 and 3, two openings, or ports, 64 may be provided in baffle member 60. Baffle member 60 forms a first zone 70 and at least one second zone 71 above the bed of inert microbial attachment media 55 within the bioreactor 50. As seen in FIGS. 1 and 2, the first zone, or space, 70 above the top bed surface 56 of the bed of inert microbial attachment media 55 is bounded by the interior surface of top cover 52, top bed surface 56, end wall 54, and the portion of baffle member 60 extending from the top cover 52 to the top bed surface 56. The second zone, or space, 71 above the bed of inert microbial attachment media 55 is bounded by top cover 52, top bed surface 56, end wall 54' and that portion of baffle member 60 extending from top cover 52 to top bed surface 56. If desired, additional baffle members 60 could be disposed within bioreactor 50 in a similar manner, whereby additional second zones 71 would be formed, the subsequent zones 71 being disposed adjacent the immediately preceding second zone 71.

Still with reference to FIGS. 1 and 2, at least one clarifier 75 is disposed in the first zone 70 and at least one clarifier 76 is disposed in the second zone 71. Clarifiers 75 and 76 may be of any suitable construction as is known in the art. For example, as illustrated in FIGS. 1 and 2, clarifier 75 has a general trough shape having a generally triangular shaped cross-sectional configuration, as viewed in FIG. 1, and may be formed of two clarification baffles 77, 78 joined by end plates 79, 80. Each clarifier 75, 76 may have an opening, or slot-shaped opening 81 formed at the lower end of each clarifier 75, 76, through which partially treated flowable waste, or waste water, may enter and thereafter be removed as will be hereinafter described. The upper edge surfaces 82, 83 of clarification baffles 77, 78 and end walls 79, 80 are disposed in bioreactor 50 above the liquid level 84 of the partially treated flowable waste, or waste water, contained within bioreactor 50, as shown in FIG. 1.

With reference to FIGS. 1-3, a plurality of nozzles 85 are disposed in the bed of inert microbial attachment media 55, and the discharge ends 86 of each nozzle are disposed in a spaced relationship from the bottom wall 53 of the bioreactor 50. The plurality of nozzles 85 are preferably connected by a plurality of manifolds 87, wherein a plurality of nozzles 85 are associated with each manifold 87 in a fluid transmitting relationship. A plurality of valves 89 may be provided for controlling the flow of liquid, as will hereinafter be described, from manifolds 87 through the plurality of nozzles 85.

For illustrative purposes, it is seen that four manifolds 87 and their associated plurality of nozzles 85 are provided within the first zone 70, and two manifolds 87 and associated nozzles 85 are associated with the second zone 71. Each of the clarifiers 75, 76 are provided with a recycle suction line, or suction pipe, 88 which is in fluid transmitting relationship with the interior of each of the clarifiers 75, 76, as will be hereinafter described in greater detail.

Apparatus 40 is fed the flowable waste, or waste water 41 to be treated through a feed pump 90. Preferably, one feed pump is utilized; however, if desired, additional feed pumps could be utilized. A plurality of recycle pumps 91 are associated with the first zone 70, and preferably a recycle pump 91 is provided for each manifold 87 associated with the first zone 70. Similarly, a plurality of recycle pumps 92 are provided for the second zone 71, and preferably a recycle pump 92 is associated with each manifold 87 associated with the second zone 71. As seen in FIGS. 1-3, feed pump 90 and recycle pumps 91 are in fluid communication by way of suitable piping 93, and recycle suction line 88 is in fluid communication with piping 93 at a location 94 intermediate feed pump 90 and recycle pump 91. Recycle suction line 88' associated with the clarifier 76 disposed within the second zone 71 is in fluid communication with the piping 95 which fluidly connects recycle pumps 92 associated with the manifolds 87 of the second zone 71.

As to the clarifier 76 disposed in the second zone 71, it is seen that the at least one opening, or ports, 64 in baffle member 60 are in fluid communication with clarifier 76, whereby, as will be hereinafter described, initially treated flowable waste, from the first zone 70 may pass from the first zone 70 through the ports 64 in baffle member 60 and into clarifier 76. Preferably, the at least one opening 64, or port, in baffle 60 is in direct fluid communication with clarifier 76 in the second zone 71, as shown in FIGS. 1 and 2 wherein the end walls 79, 80 and clarification baffle 77 abut baffle member 60 and surround the openings 64. Preferably, the second zone 71 includes a discharge clarifier 100 of similar construction to clarifier 75 and a discharge pipe 101 is in fluid communication with the interior of discharge clarifier 100. The discharge clarifier 100 is provided with an opening 81 at its lower end to permit the inflow of treated waste water into discharge clarifier 100. As seen in FIG. 3, bioreactor 50 is also preferably provided with a biogas discharge pipe in fluid communication with the interior of bioreactor 50, and in particular is in fluid communication with the space between top cover 52 of bioreactor 50 and the top, or liquid level, 84 within bioreactor 50.

With reference to FIGS. 1-3, the operation of apparatus 40 for the anaerobic treatment of waste water 40 will be described. The flowable waste, or waste water, to be treated is pumped into apparatus 40 by feed pump 90 until bioreactor 50 is filled to liquid level 84. Thereafter, recycle pumps 91 and 92 are operated. Upon operation of pumps 90 and 91, untreated waste water 41 and partially treated waste water and flowable waste from clarifier 75 enter the suction side of recycle pump 91. Manifold 87 connected to the discharge end of recycle pumps 91 direct the mixture of partially treated waste water and flowable waste into the plurality of nozzles 85 disposed in the bed of inert microbial attachment media 55. By use of suitable valves 89 and associated controls, the mixture of incoming waste water 41 and the partially treated waste water and flowable waste from clarifier 75, which passes through recycle suction line 88, the mixture may be sequentially directed through nozzles 85 to exit discharge ends 86 in a series of plugs of partially treated waste water and flowable waste. As the nozzles 85 are sequentially operated, the plugs are pushed vertically upward through the bed of inert microbial attachment media 55 and its associated microorganisms in a plug flow mode. Once the plug of the liquid mixture reach the top bed surface 56 of the bed of inert microbial attachment media 55, it is blended in the liquid contained within the first zone, or roughing zone, 70 of the bioreactor 50. A portion of the liquid contained within the first zone 70 passes through the ports 64 of the baffle member 60 into the clarifier 76 disposed within the second zone, or polishing zone, 71 within bioreactor 50. The amount of the liquid which passes into the second clarifier 76 is equal to the amount of waste water 41 to be treated which is pumped into apparatus 40 by the pump 90.

Simultaneous with the foregoing operation of feed pump 90 and recycle pumps 91, recycle pipes 92 associated with the second zone 71 are operated. The operation of recycle pumps 92 draws fluid from clarifier 76 through recycle suction line 88' associated with clarifier 76 which in turn is sequentially directed by the manifolds 87 and nozzles 85 associated with the second zone 71, into the bottom portion of the bed of inert microbial attachment media 55 beneath polishing zone 71. Sequential operation of valves 89 causes plugs of waste water and flowable waste to be pushed upwardly through the bed of inert microbial attachment media and contained microorganisms 55 of the second zone 71. Recycle suction line 88' removes all of the liquid mixture of partially treated waste water and flowable waste which has flowed into clarifier 76 from the first zone 70, along with a portion of partially treated liquid from the second zone 71, which has passed into clarifier 76 through opening 81. Simultaneous therewith, the portion of the liquid entering discharge clarifier 100 through its opening 81, is in turn discharged from bioreactor 50 through discharge pipe 101. The amount of fluid discharged through pipe 101 is again equal to the amount of inflowing waste water 41 to be treated being pumped into the apparatus by feed pump 90. Thus, bioreactor 50 is operated in a plug flow mode of operation.

It is to be understood that the invention is not limited to the exact details of construction, operation, exact materials or embodiments shown and described, as obvious modifications and equivalents may be apparent to one skilled in the art. For example, although baffle member 60 is illustrated as a flat, planar baffle member, it could have a serpentine, triangular, or other types of cross-sectional configurations, when viewed from the top of the bioreactor. Accordingly, the invention is therefore to be limited only by the scope of the appended claims.

I claim:

1. An apparatus for the anaerobic treatment of waste water, comprising:
   a plug flow bioreactor having a plurality of sidewalls, a top cover, a bottom wall, an inlet for the waste water to be treated, and a discharge for treated waste water;
   a single bed of inert microbial attachment media having anaerobic microorganisms attached to a substantial portion of the inert microbial attachment media, the bed of inert microbial attachment media substantially covering the bottom wall and having a top bed surface;
   at least one baffle member having upper and lower surfaces and side edge surfaces, the side edge surfaces being disposed in a substantially sealed relationship with the side walls, the upper surface being disposed in a substantially sealed relationship with the top cover and a portion of the at least one baffle member being disposed in contact with the top bed surface of the bed of inert microbial attachment media, the baffle member having at least one opening disposed above the top bed surface, whereby the at least one baffle member forms a first zone and at least one second zone above the bed of inert microbial attachment media within the bioreactor;
   at least one clarifier disposed in the first zone, the at least one clarifier in the first zone having a recycle line and an opening for entry of waste water from the inlet;
   at least one clarifier disposed in the at least one second zone, the at least one clarifier in the second zone having a recycle line and an opening for entry of waste water from the first zone;
   a plurality of nozzles disposed in the bed of inert microbial attachment media at least some of the plurality of nozzles in communication with waste water from the recycle line of the at least one clarifier in the first zone and at least some of the plurality of nozzles in communication with waste water from the recycle line of the at least one clarifier in the second zone; and
   the at least one opening in the at least one baffle member is in fluid communication with the clarifier in the at least one second zone, whereby waste water, after passing through at least some of the plurality of nozzles and upwardly through a portion of the bed of inert microbial attachment media into the first zone, may pass from the first zone through the at least one opening in the at least one baffle member into the clarifier in the at least one second zone, and thereafter outwardly from the bioreactor through the discharge.

2. The apparatus of clam 1, wherein the at least one second zone has a discharge clarifier through which waste water, after first flowing into the at least one clarifier in the at least one second zone, flows through the bed of inert microbial attachment media into the at least one second zone and into the discharge clarifier.

3. The apparatus of claim 1, wherein the at least one opening in the at least one baffle member is in direct fluid communication with the clarifier in the at least one second zone.

4. The apparatus of claim 1, wherein the lower surface of the at least one baffle member is disposed within the bed of inert microbial attachment media and below the top bed surface of the bed of inert microbial attachment media in a spaced relationship from the bottom wall.

5. The apparatus of claim 1, wherein the inert microbial attachment media is sand, garnet, volcanic cinders, flyash, coal, glass, plastic, activated carbon, alumina or diatomaceous earth and mixtures thereof.

6. A method for the anaerobic treatment of waste water in a plug flow bioreactor having a plurality of side walls, a top cover, a bottom wall, an inlet for the waste water, a discharge for the treated waste water, and a single bed of inert microbial attachment media having anaerobic microorganisms attached to a substantial portion of the inert microbial attachment media, the bed of inert microbial attachment media substantially covering the bottom wall and having a top bed surface, comprising:
   providing the bioreactor with at least one baffle member having upper and lower surfaces and side edge surfaces;
   disposing the side edge surfaces in a substantially sealed relationship with the side walls;
   disposing the upper surface in a substantially sealed relationship with the top cover;
   disposing a portion of the at least one baffle member in contact with the top bed surface of the bed of inert microbial attachment media;
   providing the at least one baffle member with at least one opening disposed above the top bed surface;
   forming with the at least one baffle member, a first zone and at least one second zone above the bed of inert microbial attachment media within the bioreactor;
   providing at least one clarifier in the first zone, the at least one clarifier in the first zone having a recycle line and an opening for entry of waste water from the inlet;
   providing at least one clarifier in the at least one second zone, the at least one clarifier in the second zone having a recycle line and an opening for entry of waste water from the first zone;
   providing a plurality of nozzles disposed in the bed of inert microbial attachment media with at least some of the plurality of nozzles in communication with waste water from the recycle line of the at least one clarifier in the first zone and with at least some of the plurality of nozzles in communication with waste water from the recycle line of the at least one clarifier in the second zone;
   disposing the at least one opening in the at least one baffle member in fluid communication with the clarifier in the at least one second zone;
   flowing waste water through at least some of the plurality of nozzles and upwardly through a portion of the bed of inert microbial attachment media into the first zone; and
   flowing waste water from the first zone through the at least one opening in the at least one baffle member into the clarifier in the at least one second zone, and thereafter outwardly from the bioreactor through the discharge.

7. The method of claim 6, including:
providing a discharge clarifier in the at least one second zone; and
flowing waste water from the at least one clarifier in the at least one second zone through the bed of inert microbial attachment media and into the at least one second zone and into the discharge clarifier.

8. The method of claim 6, including disposing the at least one opening in the at least one baffle member in direct fluid communication with the clarifier in the at least one second zone.

9. The method of claim 6, including disposing the lower surface of the at least one baffle member within the bed of inert microbial attachment media and below the top bed surface of the bed of inert microbial attachment media in a spaced relationship from the bottom wall.

10. The method of claim 6, including utilizing as the inert microbial attachment media, sand, garnet, volcanic cinders, flyash, coal, glass, plastic, activated carbon, alumina or diatomaceous earth and mixtures thereof.

* * * * *